(12) United States Patent
Trautwein et al.

(10) Patent No.: US 6,851,920 B2
(45) Date of Patent: Feb. 8, 2005

(54) METHOD FOR STACKING PARTS COMPRISING THERMOPLASTIC PLASTIC, AND APPARATUS FOR EXECUTING THE METHOD

(75) Inventors: Herbert Trautwein, Kirchberg (DE); Michael Wozny, Heilbronn (DE)

(73) Assignee: Adolf Illig Maschinenbau GmbH & Co., Heilbronn (DE)

( * ) Notice: Subject to any disclaimer, the term of this patent is extended or adjusted under 35 U.S.C. 154(b) by 73 days.

(21) Appl. No.: 10/098,313

(22) Filed: Mar. 18, 2002

(65) Prior Publication Data

US 2002/0114691 A1 Aug. 22, 2002

Related U.S. Application Data

(63) Continuation-in-part of application No. 09/983,222, filed on Oct. 23, 2001, now abandoned.

(30) Foreign Application Priority Data

Oct. 25, 2000 (DE) .......................................... 100 52 759

(51) Int. Cl.[7] .............................................. B65G 57/00
(52) U.S. Cl. ................................... 414/798.4; 414/801
(58) Field of Search ........................... 414/789.9, 789.2, 414/743, 801, 798.4; 198/409, 436

(56) References Cited

U.S. PATENT DOCUMENTS

| | | | |
|---|---|---|---|
| 3,491,633 A | | 1/1970 | White |
| 3,884,363 A | * | 5/1975 | Ajlouny .................. 901/16 X |
| 4,178,122 A | * | 12/1979 | Abrahamson .......... 198/409 X |
| 4,610,592 A | * | 9/1986 | Pienta ..................... 414/789.2 |

FOREIGN PATENT DOCUMENTS

| | | |
|---|---|---|
| DE | GM 71 29 534 | 7/1971 |
| DE | 73 30 314 U | 2/1975 |
| DE | 33 46 628 A1 | 7/1985 |
| DE | 44 36 531 C1 | 4/1996 |
| DE | 197 42 107 A | 3/1999 |
| DE | 198 12 414 A1 | 9/1999 |
| DE | 198 48 628 A1 | 4/2000 |
| DE | 298 18 791 | 4/2000 |
| DE | 198 52 359 C1 | 8/2000 |
| EP | 0 955 150 A | 11/1999 |
| EP | 1 201 574 A1 | 5/2002 |

* cited by examiner

Primary Examiner—Donald W. Underwood
(74) Attorney, Agent, or Firm—Venable LLP; Stuart I. Smith

(57) ABSTRACT

An improved process of stacking parts comprising thermoplastic plastic in an intermediate-storage cage, and the further transport of the stacks to subsequent devices. A pivotable stacking cage effects the transfer of the stacks onto a transverse conveyor belt, or directly to finishing devices, with the parts selectively standing up or lying down, so the apparatus is suited for both flat and tall parts. The method can be used with high cycle numbers, and allows for the mounting of devices that reliably prevent the parts from drifting apart in the intermediate-storage cage, which is particularly advantageous for flat parts.

9 Claims, 8 Drawing Sheets

METHOD FOR STACKING PARTS COMPRISING THERMOPLASTIC PLASTIC, AND APPARATUS FOR EXECUTING THE METHOD

CROSS REFERENCE TO RELATED APPLICATION

This application is a continuation-in-part of U.S. patent application Ser. No. 09/983,222, filed Oct. 23, 2001, now abandoned.

This application claims the priority of German Patent Application No. 100 52 759.0 filed Oct. 25, 2000, which is incorporated herein by reference.

BACKGROUND OF THE INVENTION

The present invention relates to a method for stacking parts that are comprised of thermoplastic plastic, and that have been molded and punched out of a heated film strip in a molding/punching tool, then transferred into an intermediate-storage cage, either directly from the tool or by a transfer device, then transferred as a stack into a stacking cage that is held on a carrier, and finally conveyed with this cage to a stack-removal station where the stacks of parts are removed. The invention further relates to an apparatus for executing the method.

The parts, which are molded and punched in a thermoforming machine by a combination molding/punching tool, are transferred into stacking magazines after being ejected from the molding/punching tool. This can be effected directly, as described in DE 33 46 628 C2, in which the mold floor of the tool is displaced, which transfers the parts into the stacking magazines, where they are then retained. It can also be effected indirectly through the interposing of a transfer device in the form of a rotating head (DE 198 52 359 A1) or a catch plate (DE 198 12 414 A1).

A problem associated with these methods is emptying the stacks that form in the stacking magazines once they reach a specific length or number of items, and transporting the stacks to a finishing device or a packaging device. This is particularly the case with multiple rows of molding/punching tools.

DE 198 48 628 A1 proposes to transfer the parts that are stacked in a mobile catch plate into a mobile stacking basket once a predetermined number of items has been reached. The basket then transports the stacks to an unloading station, where they are pushed out of the basket by rows onto a transverse conveyor belt. A drawback of this method is the time-consuming process of transferring the stacks into the displaceable stacking basket by displacing the catch plate. Certain strokes must be executed with a limited speed due to the forces of gravity and the forces acting on the parts during the transfer (risk of deformation). This problem must be solved with a precisely-adapted change in speed, which is complicated, and is limited at high cycle numbers, so it limits the cycle number. The cycle number is increasing continuously in modern machines. However, the problem lies in stacking and handling the stacks, and this condition limits the cycle number.

The known apparatus allows the stacks to be transferred lying down onto a horizontally running transverse conveyor belt. Stacks of relatively flat parts, such as lids and dishes, tend to drift apart in this position, and thus cannot be further handled. These stacks must be transported standing up, for which the apparatus is not suited. A further disadvantage is that the catch plate can move in the stacking direction, and therefore impedes or precludes the mounting of certain devices that reliably prevent the first stacked parts from tipping.

SUMMARY OF THE INVENTION

It is the object of the invention to embody the method such that the stacks can be transferred or supplied, immediately following further processing, onto a transverse conveyor belt in a standing or lying position, or an inclined position that differs from the stack position. The method is intended to permit a high cycle number and, in a modification, it may prevent the parts stacked in the stacking magazines from falling over, which is especially critical for flat parts. To this extent, the method is suitable for flat parts, such as lids, and tall parts, such as cups, and the apparatus can be easily converted. It should be possible to separate out rejected parts during startup or in the event of a fault.

The above object generally is achieved according to one aspect of the present invention by a method for stacking thermoplastic parts that have been molded and punched out of a heated film strip in a molding/punching tool, which method comprises: transferring the parts into a stationary intermediate-storage cage to form stacks of parts in the cage, either directly from the tool or by a transfer device; then transferring the stacks of parts from the intermediate storage cage into a stacking cage that is pivotally mounted on a moveable carrier; conveying the stacking cage to a stack-removal station; during the conveying or at the stack removal station, pivoting the stacking cage about a horizontal axis into a position that differs from the transfer position during the transfer of the stacks from the intermediate-storage cage to the stacking cage; and then removing the stacks of parts from the stacking cage at the stack removal station.

In general, the parts are first transferred into a stationary intermediate-storage cage and, from there, transferred into a displaceable, pivoting stacking cage, from which the stacks are transferred standing up or lying down, depending on the control programming, onto a transverse conveyor belt. Devices that are displaced as the stack grows and prevent the front parts from falling over may be disposed in the region of the intermediate-storage cage. In a modification of the invention, it is proposed to use a plurality of stacking cages, and automatically couple them to a displaceable carrier. The carrier sets down a full stacking cage, takes up an empty one and conveys it to the intermediate-storage cage. As new stacks are formed, a full stacking cage is conveyed to the stack-removal station and emptied. If necessary, the stacks located therein can be cooled in an upstream cooling station.

The above object generally is achieved according to a second aspect of the invention by an apparatus for stacking parts, comprised of thermoplastic plastic, to be disposed downstream of a thermoforming machine, with the apparatus comprising: an intermediate-storage cage for receiving the parts formed by the thermoforming machine and for storing the parts in stacks; a stacking cage positioned downstream of the storage cage in the stacking direction and mounted on a movable carrier; and a device for transferring the stacks from the intermediate-storage cage into the stacking cage; and wherein the stacking cage is mounted on the carrier for pivoting movement about a horizontal axis, and is in an operational connection with a drive for producing the pivoting movement.

The method is described in detail below with reference to schematic drawings of the apparatus.

DESCRIPTION OF THE PREFERRED EMBODIMENTS

Figure 1:
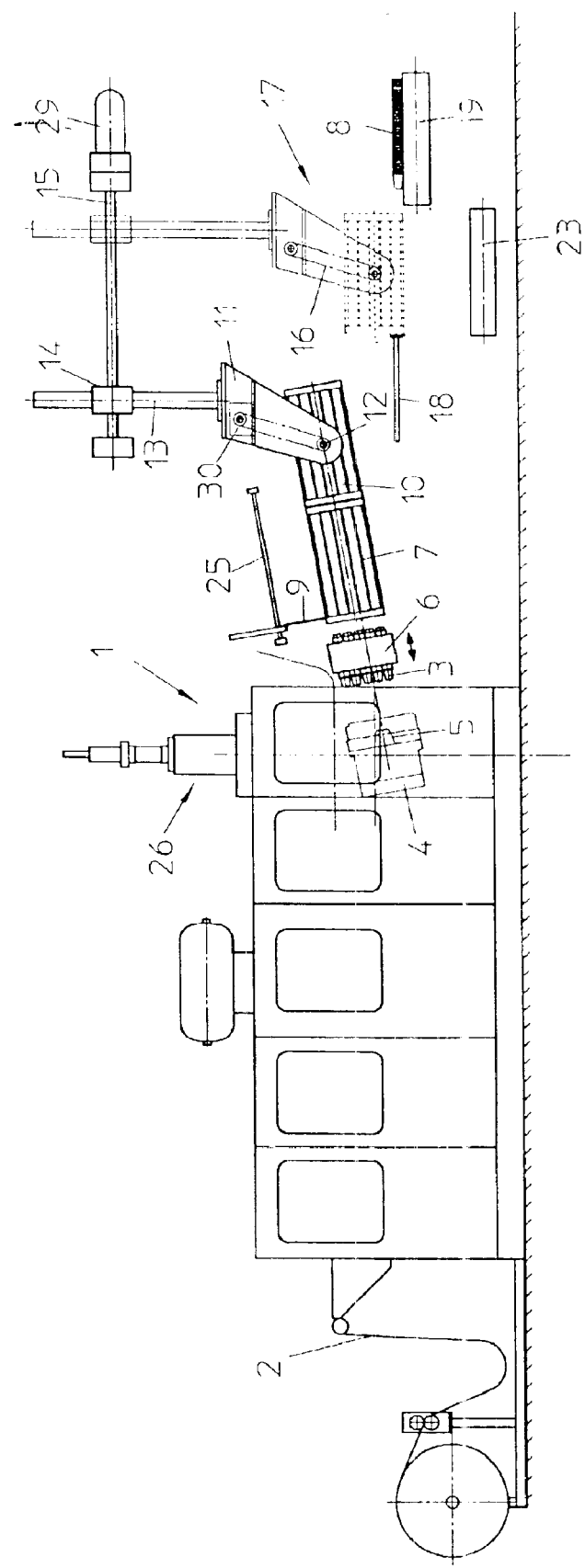
FIG. 1 is a schematic longitudinal representation of the apparatus according to the invention with an upstream thermoforming machine.

Referring now to FIG. 1, the apparatus for executing the method is disposed downstream of a thermoforming machine 1 that heats a film strip 2, and then deep-draws and punches out the parts 3 using compressed air in a combination molding/punching station 26. The table 4 of the station 26 is pivoted with the lower mold part 5 of the molding/punching tool, and the parts 3, which are arranged in a plurality of row, are ejected from the lower mold part 5. A rotating head 6 takes up the parts 3 from the mold part 5 and transfers them into a multi-row stationary intermediate-storage cage 7. Stacks 8 of molded parts 3 form in the cage 7. Depending on the size of the parts 3 and the mold surface of the upstream thermoforming machine 1, a plurality of stacks 8 may be formed in the case 7. Once the stacks 8 have reached a predetermined length or number of parts, a rake 9 which extends transverse to the stacking direction, is inserted into the case 8 and displaced in the stacking direction, so that rows of the stacks 8 are moved into a multi-row stacking cage 10 that is aligned with the intermediate-storage cage 7. The stacking cage 10 is held in a generally U-shaped carrier 11 (only one arm of the carrier 11 being shown) so as to pivot about a horizontal axis 12. The carrier 11 is connected with rods 13 that are held in a guide member 14 for vertical displacement by a drive, not shown. The guide member 14, in turn, is mounted on stationary guides 15 so that it can be horizontally displaced by a drive 29. A drive 30 disposed on the carrier 11 effects the pivoting of the stacking cage 10 about the horizontal axis 12 via a chain drive 16.

In accordance with a first variation of the method, the carrier 11 travels horizontally into the stack-removal station 17 with the stacking cage 10 after the transfer of the stacks 8. There, the drive 30 pivots the stacking cage 10 into a horizontal position and displaces it vertically until a row of stacks 8 can be transferred onto the transverse conveyor belt 19 by an ejector 18. After the stacking cage 10 has been lowered by the distance of one row, the ejector 18 pushes the next row of stacks 8 out of the stacking cage 10 onto the transverse conveyor belt 19. This is repeated row by row until all rows of stacks of 8 have been transferred.

Figure 3:
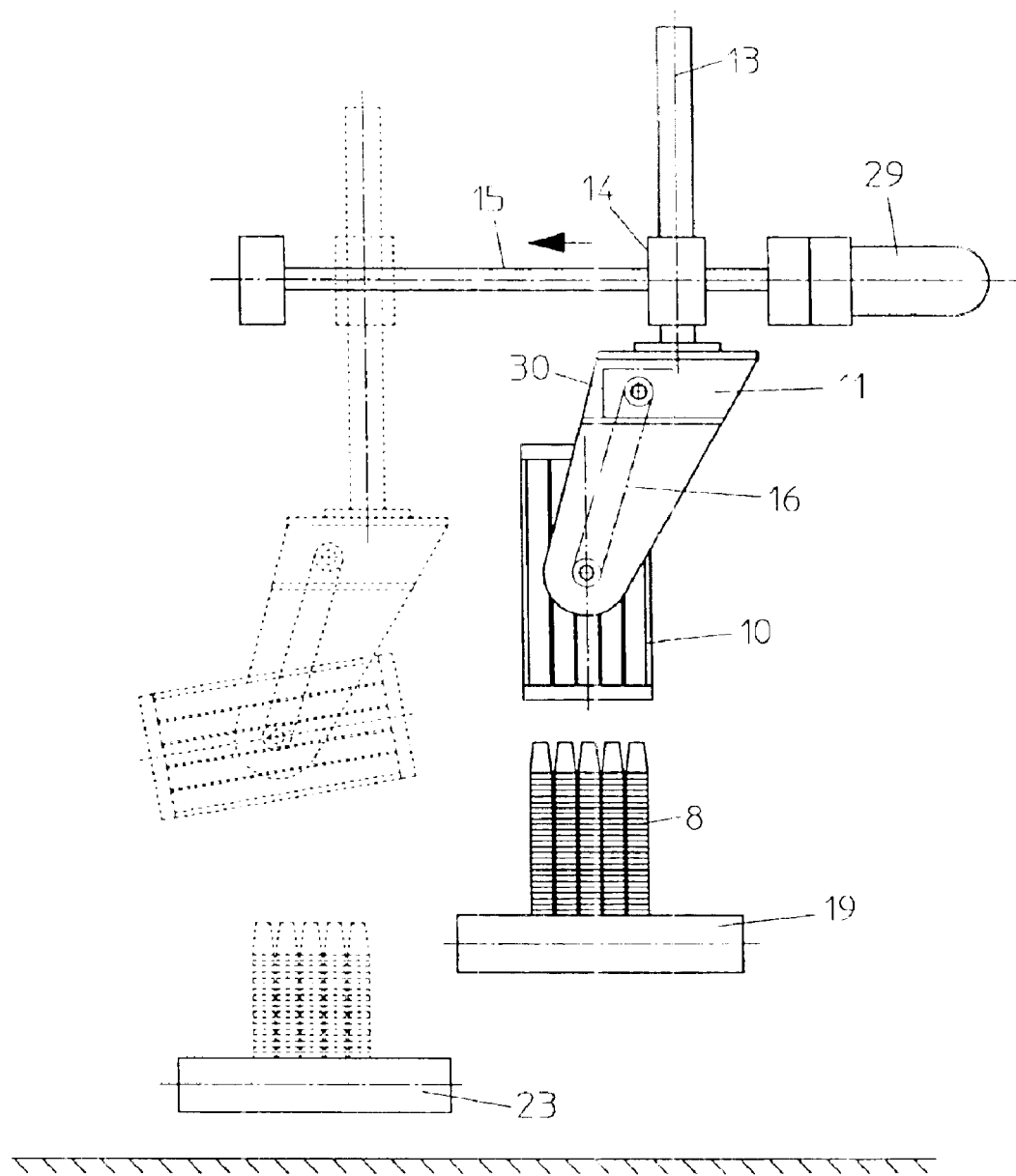
FIG. 3 shows a variation of the stack transfer, portion of the disclosed method.

FIG. 3 illustrates a variation of the method in which the stacking cage 10 pivots, before the stacks 8 are transferred, to displace the cage from a horizontal position into a vertical position, and the cage sets the stacks 8, standing up, onto the transverse conveyor belt 19. The cage 10 then rises again (position shown in FIG. 3) and travels back to its position adjacent cage 7. In this way, stacks 8 comprising flat parts such as lids or shallow dishes can be transported further. Stacks 8 of such items would fall apart in a horizontal position. If needed, the stacking cage 10 can be pivoted into any desired inclined position, or not pivot at all, should this be of advantage for some reason.

Figure 8:
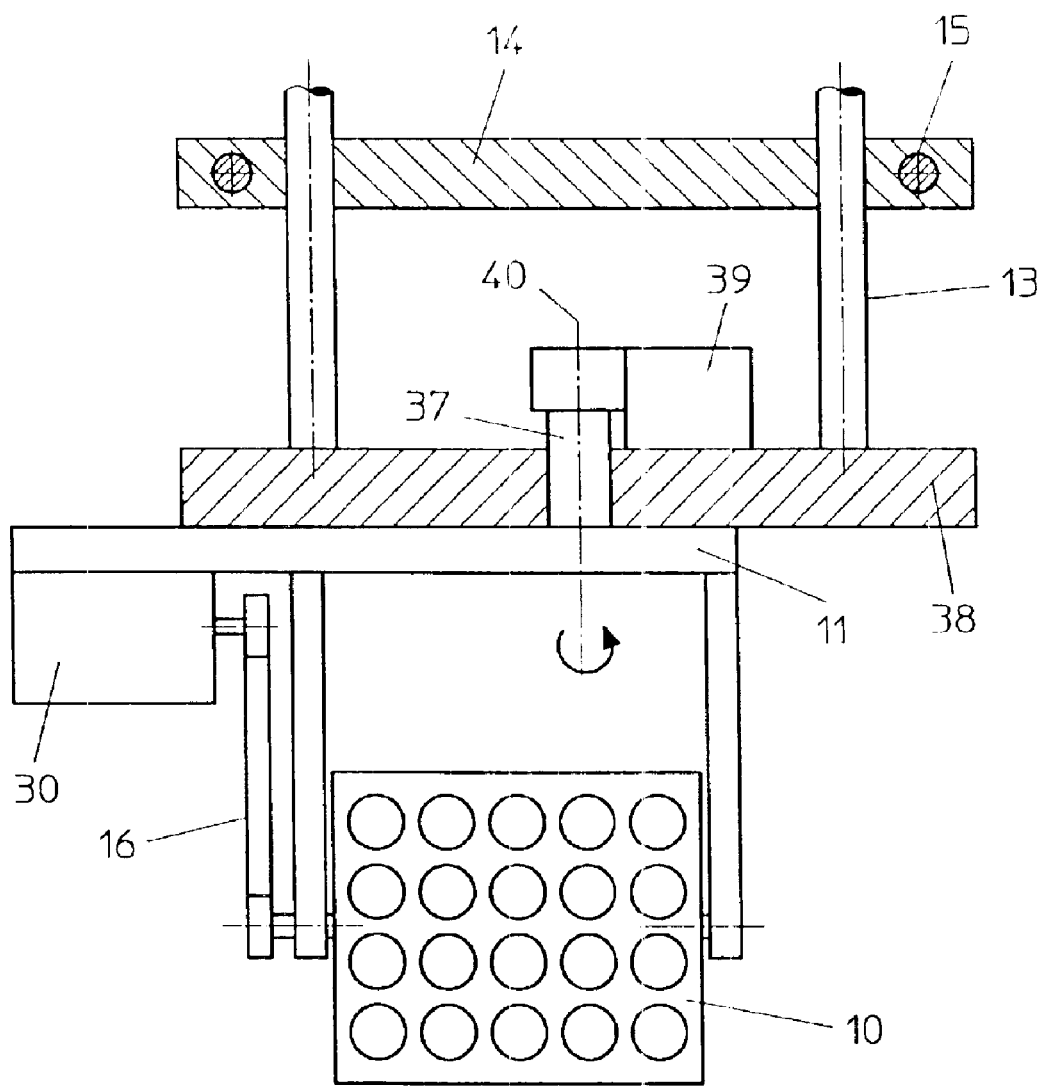
FIG. 8 shows a variation of the embodiment of the carrier for the stacking cage.

In a modification of the method, it is proposed to embody the carrier 11 so that it can additionally pivot about a vertical axis 40, as shown in FIG. 8. For this purpose, The carrier 11 is mounted to rotate via a pin 37 seated in a crossbeam 38, to which the rods 13 are secured. A drive 39, e.g., in the form of a pneumatic pivoting cylinder or a servomotor, serves to pivot the entire carrier 11 about the axis 40 of the pin 37. In this manner, the stacks 8 can be set down or pushed out transversely or in an arbitrary rotational position, should this be advantageous for further processing of the stacks 8.

Figure 9:
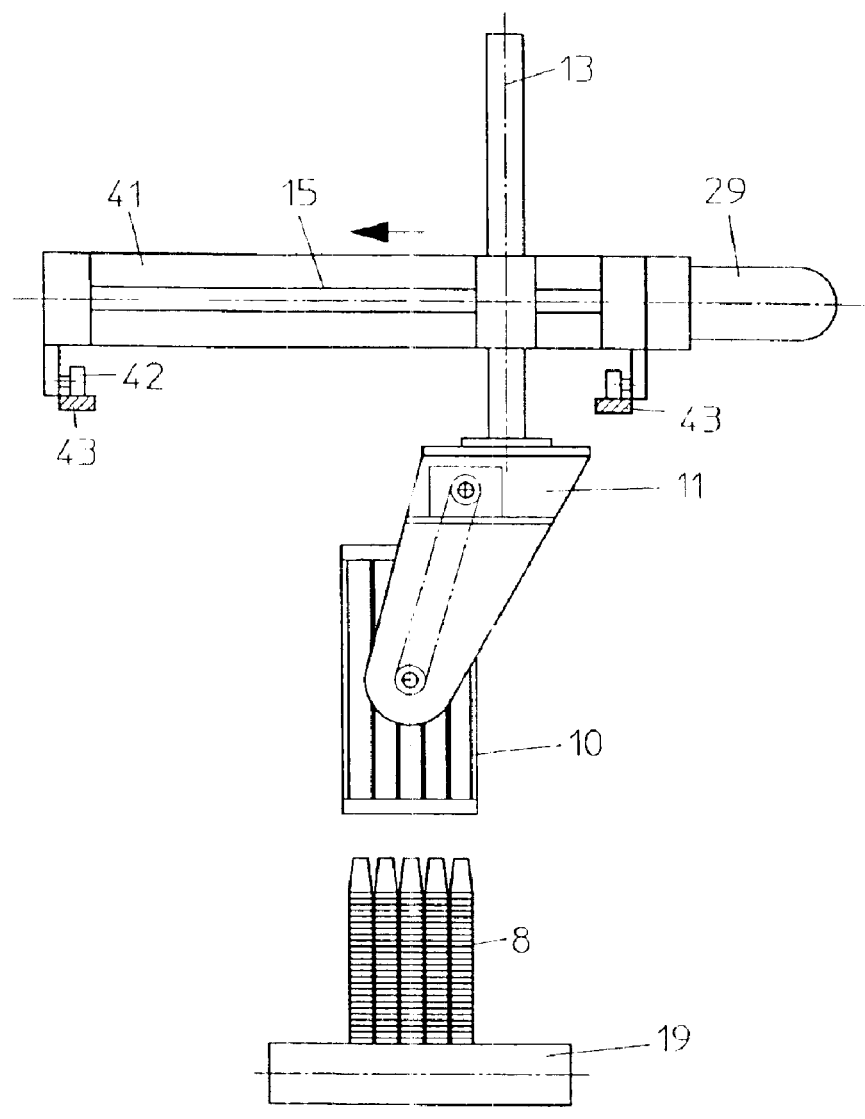
FIG. 9 shows a variation of the displacing device of the stacking cage.

An even more universal embodiment is shown in FIG. 9. In this arrangement the guides 15 are seated on a frame 41 that supports rollers 42. These rollers rest on transverse carriers 43 that are oriented so that the frame 41 can be displaced transversely to the stacking direction with a drive, not shown. The stacking cage 10 can thus be set down or emptied at arbitrary locations.

Figure 2:
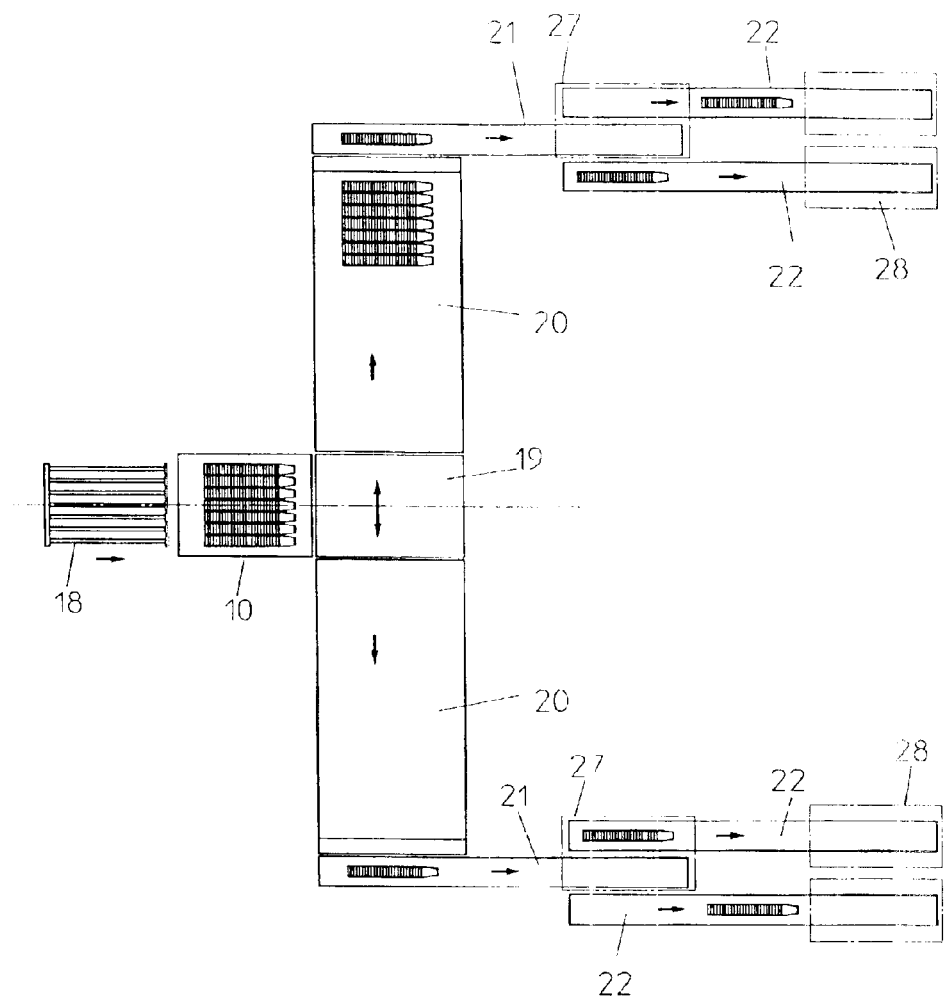
FIG. 2 is a plan view of a version of a portion of the apparatus.

FIG. 2 illustrates a possible modification of transport for the stacks 8. The transverse conveyor belt 19 can alternately transfer a row of stacks to the right or left onto one of the conveyor belts 20. These belts 20 then bring the stacks 8 one behind the other onto a respective longitudinal conveyor belt 21, from which it is possible to distribute the stacks onto two further longitudinal conveyor belts 22 by a transfer device 27. In this manner, a large number of parts 3 can be processed in a total of four finishing stations 28, e.g., bordering machines and packaging machines, as needed.

Figure 7:
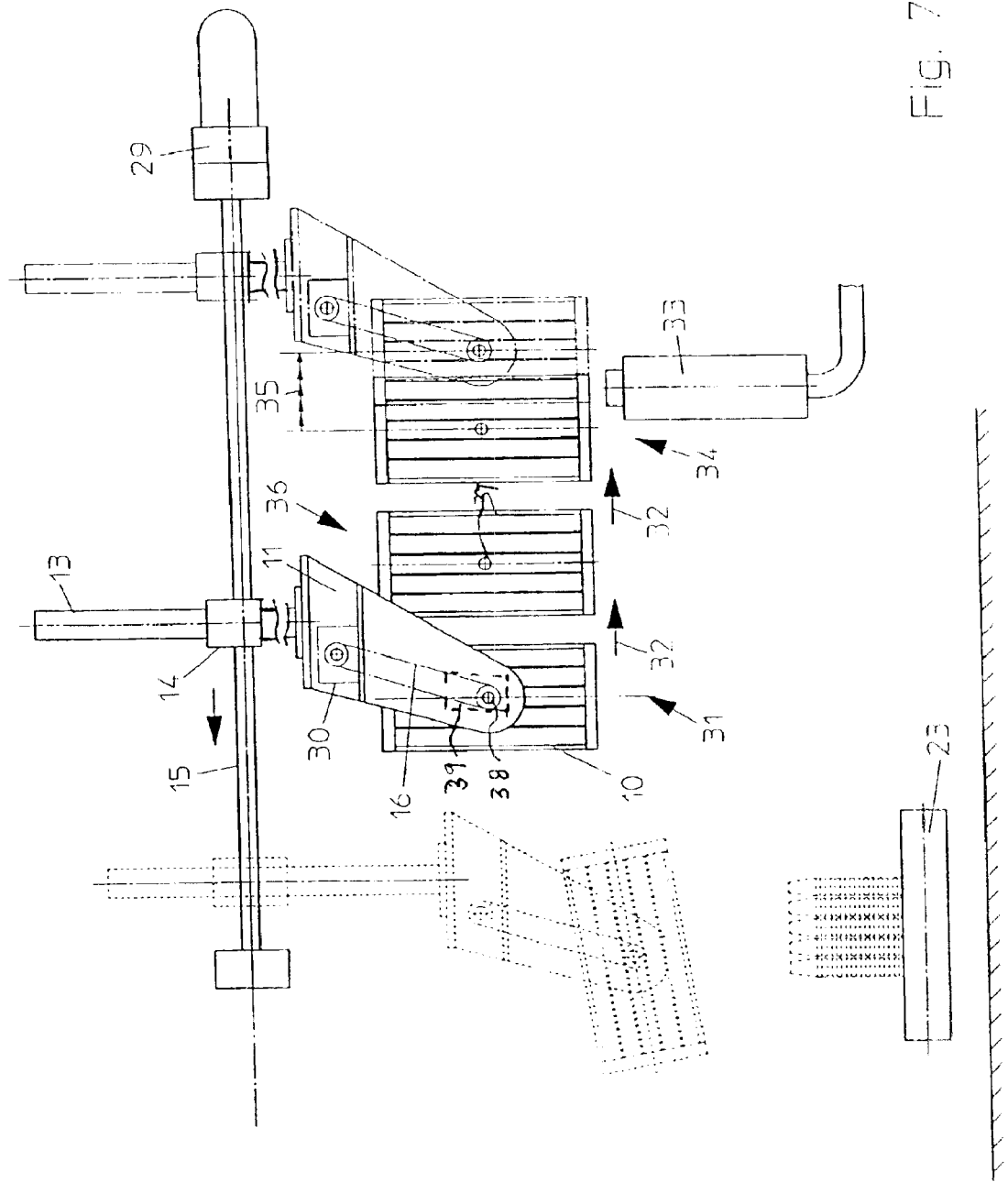
FIG. 7 shows a modification of the invention, with a plurality of exchangeable stacking cages.

A modification of the invention according to FIG. 7 consists of employing a plurality of stacking cages 10 and embodying them to be coupled, preferably automatically, to the carrier 11. For this purpose, each stacking cage 10 is provided with a pair of bores 37 that are axially aligned along the pivot axis 12. To engage these bores 37, the carrier 11 is provided with a pair of axially aligned pins 38 that are axially moveable into and out of the bores 37 under control of a control device 39 mounted on the carrier 11. The carrier 11 conveys the stacking cage 10 to a release station 31, where cage 10 is decoupled from the carrier 11, e.g., by retraction of the pins 38, and each stacking cage 10 is horizontally guided through a displacing device 32 to an unloading station 34, in which the stacks 8 are preferably guided out of the cage 10 by rows and supplied to, for example, a finishing station 33. If the stacking cages 10 are set down vertically, they are provided, in a known manner, with a device that releases the retaining device for the stacks 8 by rows, so that they fall down out of the stacking cage 10. A schematically shown displacing device 35 pushes the stacks 8 forward by the distance of one row at a time, so the next row can be emptied.

It is possible to dispose a cooling station 36 between the release station 31 and the unloading station 34 for suitably cooling the stacks 8, for example, by blowing in cool air, which can be sterile. After the emptied stacking cage 10 has been disposed horizontally (position shown in dot-dash lines in FIG. 7), the carrier 11 receives and is coupled to the cage 10 and conveys it back to a position adjacent the intermediate-storage cage 7. For this purpose either the guide 15 must be sufficiently raised above the cage 10 in the stations, 31, 35 36 so that a cage 10 coupled to the carrier 11 can move above same between stations 31 and 35, or guide 15 is replaced with a continuous or endless transfer path (horizontal path) for moving the carrier 11 between various stations.

Instead of being set down vertically, as shown in FIG. 7, the stacking cages 10 can be pivoted horizontally in the same way, then set down in a lying-down position and displaced. An ejector comparable to the ejector 18 in FIG. 2 then transports the stacks 8 out of the cage by rows.

If low-quality parts 3 are produced when the thermoforming machine 1 is started up (startup rejection), these parts 3 can preferably be ejected or set onto a separate transverse conveyor belt 23 located to the side of the transverse conveyor belt 27, after the stacking cage 10 has been pivoted into the vertical position. The parts are then transported out of the apparatus and inspected. If acceptable parts are being produced, the apparatus is switched to automatic operation. This prevents low-quality parts from entering later production phases and needing to be sorted out in a time-consuming manner. It is also possible to transfer or set the stacks onto the transverse conveyor belt 19 and transport them out of the apparatus.

Figure 4:
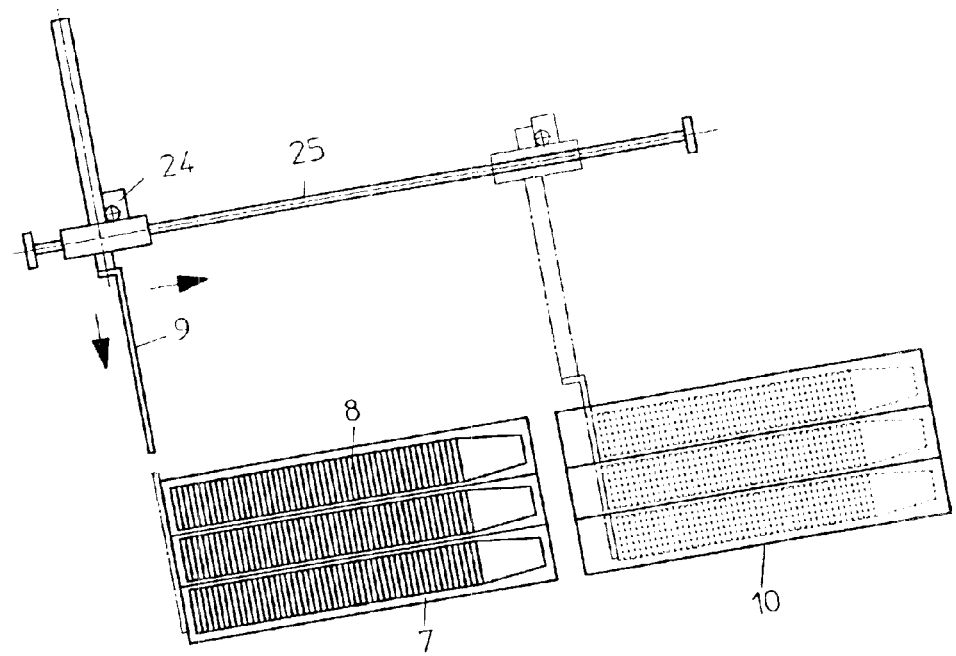
FIGS. 4–6 illustrates different modes and operation of an intermediate-storage cage with a stack-removal device that functions as a retaining device.

The described method executed with an apparatus having a stationary intermediate-storage cage 7 and one or more displaceable, pivotable stacking cages 10 permits the front parts 3 of the stacks 8 to be retained as follows:

FIG. 4 illustrates, by way of example, a triple-row molding/punching tool with the arrangement of a rake 9, which can be displaced perpendicular to the stacking direction by a drive 24 and is pushed in between two cycles of the thermoforming machine 1. It can also be displaced in the stacking direction on guides 25, and transfers the stacks 8 from the intermediate-storage cage 7 into the stacking cage 10 (position shown in dot-dash lines in FIG. 4).

Figure 5:
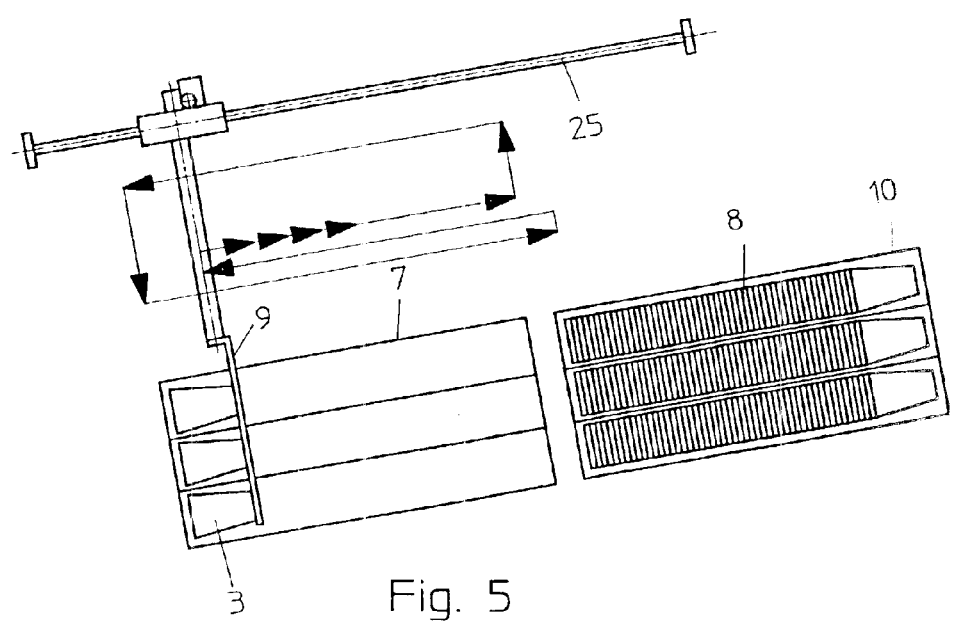

One procedure involves transferring all stacks 8 into the stacking cage 10 after the rake 9 has been pushed in, then retracting the rake 9 into the intermediate-storage cage 7, into a position (FIG. 5) in which the bottom of the first part 3 is held against the rake. Each time another part 3 is stacked in the intermediate-storage cage 7, the rake 9 travels further along a programmed path corresponding to the stack spacing between two parts 3, so the front part 3 is always held. Shortly before the stacks 8 have reached their necessary number, the rake 9 leaves the intermediate-storage cage 7 to the left, and returns to the position shown in a dot-dash line on the left in FIG. 4, so all of the stacks 8 can now be guided out of the intermediate-storage cage 7. Afterward, the rake 9 returns to its initial position. This course of movement is indicated by arrows in FIG. 5.

Figure 6:
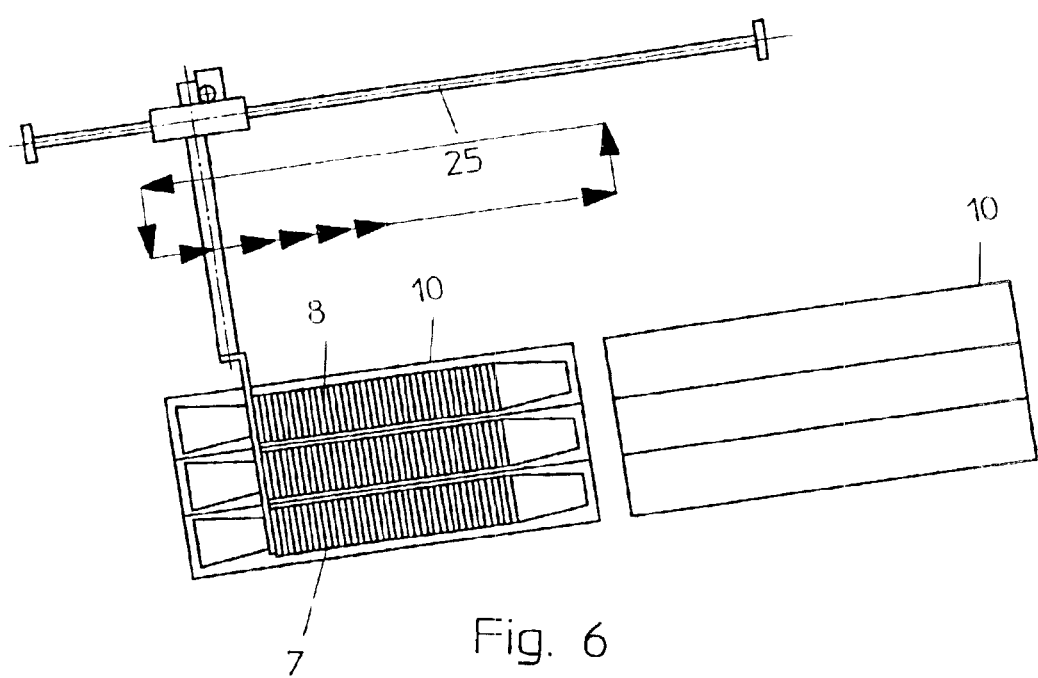

Another possible procedure is for the rake 9 to execute a stroke only in the stacking direction, starting from the initial position shown in a dot-dash line on the left in FIG. 4, thereby displacing the stacks 8 so far that the next parts 3 can be stacked and supported against the rake 9. This position is shown in FIG. 6. Again, the rake 9 is displaced in the stacking direction by the stack spacing with each cycle. After a few cycles, when the newly-stacked parts 3 have centered one another, the rake 9 executes its clearing stroke, thereby transferring all stacks 8 into the stacking cage 10, then returns to its initial position. This course of movement is indicated by arrows in FIG. 6.

For the rake 9 to be able to follow this course of movement in the stacking direction, a servomotor-driven linear drive is preferably used as the drive 29; in this instance, the starting time and travel paths are calculated and preset by the control unit as a function of the number of parts 3 per stack 8 and the stack spacing of the parts 3.

The invention now being fully described, it will be apparent to one of ordinary skill in the art that many changes and modifications can be made thereto without departing from the spirit or scope of the invention as set forth herein.

What is claimed is:

1. A device for stacking parts of thermoplastic plastic, said device comprising:

a buffer container to which the parts that are stamped out of a heated film in a molding/punching tool are transferred;

a stacking container, mounted on a support so as to pivot around a horizontal axis, which stacking container must be displaced and to which the parts are transferred from the buffer container in the form of stacks and which is used to transport the parts to a release station;

an automatically operated coupling device provided between the support and the stacking container to uncouple the stacking container at the release station; and a displacement device provided for the further transport, from the release station to a stack removal station, of stacking containers uncoupled from the support.

2. The device according to claim 1, further comprising means for rotating the support around a vertical axis.

3. The device according to claim 1, further comprising means for displacing the support in a stacking direction or crosswise to the stacking direction.

4. The device according to claim 1, further comprising a cooling station arranged between the release station and the stack removal station.

5. The device according to claim 1, further comprising a transfer device for transferring the stacks from the buffer container to the stacking container, said transfer device being driven by a servomotor.

6. The device according to claim 1, further comprising a transfer device for transferring the stacks from the buffer container to the stacking container, said transfer device being a rake which can be displaced both in a stacking direction and crosswise to the stacking direction.

7. The device according to claim 6, wherein the rake for transferring the stacks from the buffer container into the stacking container is usable as support for the parts that are transferred to the buffer container.

8. The device according to claim 7, further comprising means for, subsequent to the rake transferring all of the stacks from the buffer container to the stacking container, moving the rake back to the buffer container, before the frontal parts of the stacks, and for displacing the rake in the stacking direction in several cycles, in each cycle by the spacing between two adjacent parts in a stack.

9. The device according to claim 7, further comprising means for inserting the rake from a side behind the stacks in the buffer container, displacing the rake in the stacking direction by an amount that corresponds to the height of one of the parts and then performing several cycles of pushing the stacks by an amount corresponding to the spacing of adjacent parts in a stack, and transferring the stacks to the stacking container.

* * * * *